US007513956B2

(12) United States Patent
Bruno

(10) Patent No.: US 7,513,956 B2
(45) Date of Patent: Apr. 7, 2009

(54) TOP-DOWN FLOOR CLEANING SYSTEM

(75) Inventor: Zorzo Bruno, Onara di Tombolo (IT)

(73) Assignee: FILMOP S.r.l., Pavoda (IT)

( * ) Notice: Subject to any disclaimer, the term of this patent is extended or adjusted under 35 U.S.C. 154(b) by 783 days.

(21) Appl. No.: 10/942,467

(22) Filed: Sep. 16, 2004

(65) Prior Publication Data

US 2006/0053579 A1   Mar. 16, 2006

(51) Int. Cl.
*B08B 7/00* (2006.01)
*A47L 13/20* (2006.01)

(52) U.S. Cl. .................... 134/6; 134/42; 15/260

(58) Field of Classification Search .......... 134/6, 134/42, 25.4, 10; 15/257.01
See application file for complete search history.

(56) References Cited

U.S. PATENT DOCUMENTS

| 3,199,136 | A | * | 8/1965 | George ............... 15/231 |
| 4,858,555 | A | * | 8/1989 | Arsene et al. ........ 118/270 |
| 5,183,280 | A | | 2/1993 | Gresch |
| 5,804,274 | A | | 9/1998 | Nordin |
| D415,867 | S | | 10/1999 | Perelli |
| 6,032,289 | A | * | 3/2000 | Villapiano ............ 2/102 |
| 6,497,423 | B1 | | 12/2002 | Perelli |
| 6,523,220 | B1 | | 2/2003 | Lynn |
| 6,662,401 | B2 | | 12/2003 | Zorzo |
| 6,687,943 | B2 | | 2/2004 | Zorzo |
| 2002/0175092 | A1 | | 11/2002 | Stulens |
| 2003/0106568 | A1 | | 6/2003 | Keck |
| 2003/0121116 | A1 | | 7/2003 | Keck |
| 2003/0155354 | A1 | * | 8/2003 | Tucker .............. 220/4.24 |
| 2004/0040574 | A1 | | 3/2004 | Zeichhuber |
| 2004/0074520 | A1 | | 4/2004 | Truong |

FOREIGN PATENT DOCUMENTS

DE   EP000570900 A1   11/1993

OTHER PUBLICATIONS http://www.florstor.com/Sh-Mop.html from Dec. 4, 2002 now published as http://web.archive.org/web/20021204222653/http://www.florstor.com/Sh-Mop.html.*

* cited by examiner

*Primary Examiner*—Michael Barr
*Assistant Examiner*—Saeed T Chaudhry
(74) *Attorney, Agent, or Firm*—James L. Jackson

(57) ABSTRACT

A method and apparatus for cleaning and/or disinfecting floor surfaces. A floor service trolley defines mop cloth container receptacles and a soiled mop cloth receptacle. Rectangular tapered mop cloth containers are supported by the container receptacle and define an upper sealing rim. A closure defines a seal recess containing a sealing member establishing a seal between the upper sealing rim and the closure preventing leakage of liquid from the container when it is inverted. Mop cloths are stacked within the container and are evenly pre-impregnated with cleaning solution by adding cleaning solution to the container of mop cloths, assembling the closure in sealed relation with the container and inverting the container for a sufficient period of time for saturation of the mop cloths by action of osmosis.

3 Claims, 9 Drawing Sheets

TOP-DOWN FLOOR CLEANING SYSTEM

BACKGROUND OF THE INVENTION

1. Field of the Invention

The present invention relates generally to methods and apparatus for cleaning floors, particularly the large dimension floor surfaces of commercial establishments, such as schools, hospitals, assisted living facilities, restaurants and the like, where floor cleaning and disinfecting is desired. The present invention also relates to small dimension floor surfaces, for example, the room of a sick or invalid person where cleanliness is of paramount importance. More particularly, the present invention concerns the provision of a cleaning system and the method of its use, wherein a floor cleaning trolley is provided for a floor cleaning crew, the trolley providing mobile transport for the various implements and cleaning materials that are needed for cleaning and disinfecting large floor surfaces. Also, the present invention concerns the provision of a hermetically sealable mopping cloth container that is transported by the trolley, enabling microfiber mopping cloths to be pre-impregnated in a laundry facility with floor cleaning and disinfecting agent, thereby minimizing the potential for spillage of chemical cleaning materials in rooms where floor cleaning is done and minimizing contact of soiled mopping cloths by workers.

2. Description of the Prior Art

It is well known that the large floors of many commercial establishments should be disinfected as well as being cleaned, to thereby protect patients, students and workers from coming into contact with potentially dangerous bacteria during use of the facilities. It is also well known that floor cleaning personnel often use trolley devices for transporting cleaning and disinfecting materials and the equipment that is used for floor cleaning. Typically floor cleaning agents and disinfecting agents are mixed in a bucket at the site of use and floor mopping is then done. Periodically, the soiled heads of mops are placed within the bucket and agitated to liberate the soiling material, such as dirt, dust and other debris from the material of the mop head into the liquid material of the bucket. The material of the mop head is then subjected to squeezing action, typically by means of a mechanical wringer or mechanical compression device. Obviously, as the liquid material of the bucket becomes more and more soiled the mop head does not get properly cleaned, so that a residue of soiling material and cleaning and disinfecting agent will remain on the floor surface as the result of mopping.

Since it is well known that less contaminant residue will remain on a cleaned and disinfected floor surface if soiled mop heads or cloths are removed from the mop and either disposed of or cleaned of the contaminant material, more recently, disposable mop head materials have been provided. These disposable mop head materials have been found quite acceptable for domestic use; however they have been determined to be too expensive for use on a commercial basis. Consequently, many commercial establishments have laundry rooms or special facilities for storing and handling floor mopping equipment and materials. The mop devices that are used have removable mop cloths. The mop cloths are usually saturated with cleaning and disinfecting materials by dipping them in a bucket of the mixture and then using them to scrub and mop the floor surface. When the mop cloths become soiled, they are removed from the mop head and placed in a soiled cloth receptacle. From time to time the soiled cloth receptacle is transported to the laundry facility where the cloths are placed in a washing machine and subjected to cleaning activity. The cleaned mop cloths may then be re-used many times.

As mentioned above, the floor mopping and disinfecting material is typically prepared at the site of the floor to be cleaned. In addition to a bucket for the floor mopping and disinfecting material, a typical floor cleaning trolley will have containers of soap or surfactant and containers of disinfectant material. As these materials are being added to a bucket of water and then mixed, some of these concentrated cleaning and disinfecting materials can be spilled, possibly causing damage to the floor surface or contamination of the environmental air of the facility. It is desirable therefore to provide for the mixing of cleaning and disinfectant materials in the laundry facility, away from the site of the floor surface to be cleaned. It is also desirable to ensure that the floor mop cloths are properly saturated with an efficient mixture of floor cleaning material and disinfectant material so that the cloths have an optimum moisture content for properly cleaning and disinfecting the floor surface.

SUMMARY OF THE INVENTION

It is therefore a principal feature of the present invention to provide a novel floor cleaning and disinfecting system employing re-useable mopping cloths composed of microfiber material and which are pre-saturated with a floor cleaning and disinfecting solution by placing new or clean mop cloths in a container, adding a measured quantity of floor cleaning and disinfecting solution, closing and hermetically sealing the container and then inverting the filled container for a sufficient period of time for all of the mop cloths of the container to become saturated by osmosis.

It is another feature of the present invention to provide a novel floor cleaning and disinfecting system employing a unique floor cleaning trolley that provides floor cleaning and disinfecting personnel with the capability for moving floor cleaning equipment and materials to a site to be cleaned and accomplishing cleaning and disinfecting activity without coming into physical contact with floor mop cloths.

It is also a feature of the present invention to provide a novel floor cleaning and disinfecting system enabling efficient use, cleaning and re-use of floor mop cloths, thus enabling efficient and low cost cleaning of floor surfaces.

Briefly, the various objects and features of the present invention are realized through the provision of a trolley for use by floor cleaning personnel and which is designed to transport devices and materials to a floor site for cleaning and disinfecting the floor surface. The trolley is designed to provide mobile support for a container of re-useable pre-saturated mop cloths that are positioned so as to be picked from the container by the head of a floor mop device and used until the mop cloth has become soiled to the extent of needing replacement. The mop cloths are composed of microfiber material to provide for superior floor cleaning capability and to provide long lasting use. The microfiber floor mop clothe material permits the mop cloths to be cleaned and re-used numerous times, thereby promoting the efficiency and low cost nature of the floor cleaning and disinfecting process. The trolley also provides support for a receptacle within which soiled mop cloths are placed after they have been removed from a mop head.

An important feature of the present invention is the provision of a clean mop cloth container having a hermetically sealed removable lid. The mop cloth container is designed to receive a stack of clean mop cloths. A desired quantity of cleaning and disinfecting solution is then poured into the container of clean mop cloths and a hermetically sealed lid is then put in place. The mop cloth container is then inverted and permitted to remain in this inverted position for a sufficient period of time to permit the mop cloths to become evenly saturated with the cleaning and disinfecting solution by action of osmosis to ensure optimum moisture content for efficient cleaning and disinfecting of a floor surface.

BRIEF DESCRIPTION OF THE DRAWINGS

So that the manner in which the above recited features, advantages and objects of the present invention are attained and can be understood in detail, a more particular description of the invention, briefly summarized above, may be had by reference to the preferred embodiment thereof which is illustrated in the appended drawings, which drawings are incorporated as a part hereof.

It is to be noted however, that the appended drawings illustrate only a typical embodiment of this invention and are therefore not to be considered limiting of its scope, for the invention may admit to other equally effective embodiments.

In the Drawings:

FIG. 1 is an isometric illustration of a floor cleaning trolley and containers of pre-saturated mop cloths, together with a soiled mop cloth container and/or refuse container, and embodying the principles of the present invention;

FIG. 2 is an isometric illustration of the floor cleaning trolley of FIG. 1, showing a removable container or receptacle removably supported thereby;

FIG. 3 is an isometric illustration of the floor cleaning trolley of FIG. 1, showing the closure thereof pivoted to its open position;

FIG. 4 is a side elevational view of the floor cleaning trolley of FIGS. 1-3;

FIG. 5 is a rear elevational view of the floor cleaning trolley of FIGS. 1-4;

FIG. 6 is an isometric illustration of a hermetically sealable mop cloth container embodying the principles of the present invention and being show in its upright position with its carrying handle at its upstanding position relative to the container;

FIG. 7 is a plan view of the hermetically sealable mop cloth container of FIG. 6;

FIG. 8 is a bottom view of the hermetically sealable mop cloth container of FIGS. 6 and 7;

FIG. 9 is a side elevational view of the hermetically sealable mop cloth container of FIGS. 6-8;

FIG. 10 is an elevational end view of the hermetically sealable mop cloth container of FIGS. 6-9;

FIG. 11 is a cross-sectional illustration showing the wall structure, support structure, closure and closure sealing and locking geometry of the mop cloth container of the present invention;

Figure 12:
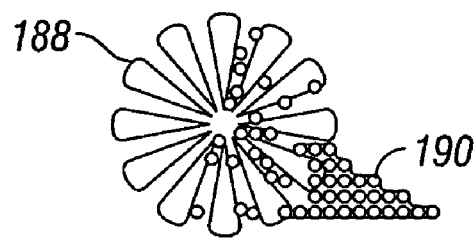
Figure 13:
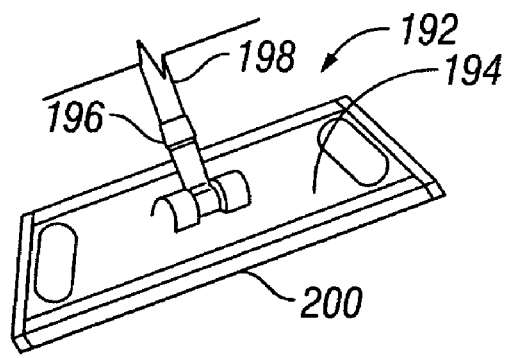
Figure 14:
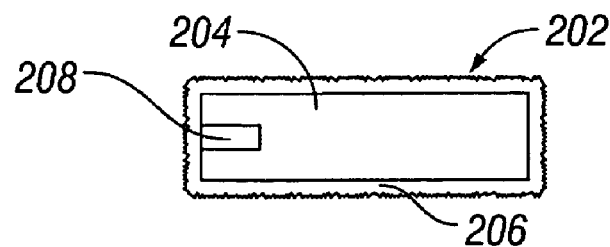

FIG. 12 is an schematic pictorial illustration of a microfiber and showing the manner by which it collects and holds dirt and moisture during floor cleaning and disinfecting activity;

FIG. 13 is a pictorial illustration of a mop head having a panel of hook and loop fastener material thereon and being adapted for releasable retention of microfiber mop cloths according to the present invention; and FIG. 14 is a plan view of a microfiber mop cloth having an opposite panel of hook and loop fastener material thereon for releasable attachment with the mop head of FIG. 13 and having part of the mop cloth broken away to show a portion of the panel of hook and loop fastener material thereof.

DETAILED DESCRIPTION OF PREFERRED EMBODIMENT

Referring now to the drawings and first to FIGS. 1-5, a trolley mechanism, shown generally at 10 having a trolley framework shown generally at 12. The trolley framework may be composed of a wide range of materials depending on the needs of the user. For example a wide range of polymer materials, stainless steel material, plated or painted steel material may be utilized for construction of many of the structural components thereof. The trolley framework comprises a pair of side members 14 and 16 with side member 14 defining front and rear legs 18 and 20 and side member 16 defining front and rear legs 22 and 24. A front transverse and horizontal support strut member 26 has ends that are fixed in any suitable manner to the front legs 18 and 22 and a rear transverse and horizontal support strut member 28 has ends that are fixed to the rear legs 20 and 24. The front transverse and rear horizontal support strut members 26 and 28 define upstanding front and rear tray locking elements 30 and 32.

Figure 2:
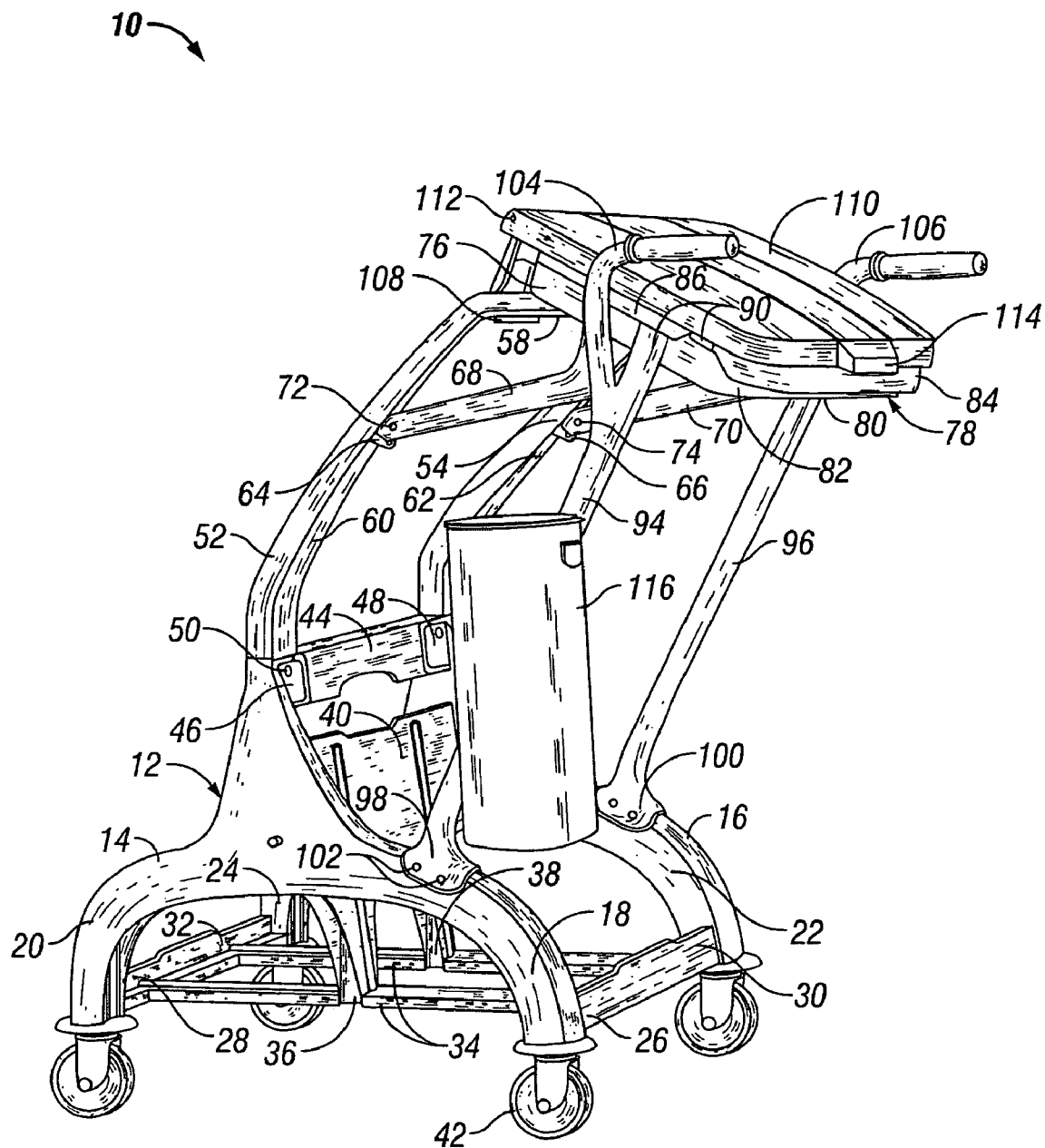

Tray members 31, one of which is shown in FIG. 2 are supported at least partially by the front and rear horizontal support strut members 26 and 28. The tray members are locked against forward or rearward movement by the tray locking elements 30 and 32 respectively. The front tray member will be removably supported by the front portion of the trolley framework and may be similar or identical of the support tray 31 if desired. A plurality of tray support members 34 have ends that are fixed to the respective front and rear transverse horizontal support strut members 26 and 28 and ends that are connected with the lower bifurcated ends 36 and 38 of an intermediate supporting and reinforcing partition 40. The lower horizontal support members 34 provide releasable support for the tray members 31. Side portions of the intermediate supporting and reinforcing partition 40 are fixed to the side members 14 and 16 of the trolley framework 12 to assist in maintaining the side members in substantially parallel relation and in substantially upright position and lower bifurcated end portions 36 of said reinforcing partition 40 are connected for support of said tray support members 34. Thus, the intermediate supporting and reinforcing partition 40 defines front and rear container compartments within the trolley framework. The front container compartment typically provides for location and support of one or more mop cloth containers of the nature shown in FIG. 6 and the rear container compartment provides for location of the lower portion of a soiled mop cloth container or refuse container that is supported by the upper portion of the trolley framework.

Mobility of the trolley mechanism 10 is provided by a plurality of wheel units 42, at least the front or rear of which are in the form of casters that enable the trolley mechanism to be steered as it is manually moved along a floor surface.

The trolley framework 12 incorporates a transverse brace member 44 having connecting ends 46 and 48 that are fixed by fasteners 50, such as bolt and nut assemblies, to upper portions of the side members 14 and 16. The connecting ends 46 and 48 define recesses or receptacles that also receive the lower ends of a pair of upstanding front support members 52 and 54, so that the fasteners 50 also secure the lower ends of the upstanding front support members 52 and 54 in fixed relation with the transverse brace member 44 and the lower portion of the trolley framework. The upstanding front support members 52 and 54 are defined by an inverted U-shaped member 56 having a generally horizontally oriented integral connecting member 58. The upstanding front support members 52 and 54 define intermediate support regions 60 and 62 to which a pair of brace connector members 64 and 66 are fixed. Lower ends of inclined support brace members 68 and 70 are connected with the brace connector members 64 and 66 by fastener members 72 and 74 such as bolts, screws rivets or any other suitable fastener members. The upper ends of the inclined brace members 68 and 70 are connected with spaced generally straight side portions 76 of a container support structure shown generally at 78, thus providing fixed support for the container support structure relative to the trolley framework.

The container support structure 78 is of generally rectangular configuration, having a rectangular container support frame 80 defining rounded rear corners 82 and defining rear and side flanges 84 and 86. The rear and side flanges provide for support of a container 88 shown in FIG. 1 that may be employed to receive soiled mop cloths or to receive the refuse that is typically collected when a facility is cleaned. Retainer clip members 90 are employed to secure the upper, open end of the container 88 to the rectangular container support frame 80. The side flanges 86 are slightly spaced from the side portions of the rectangular container support frame 80 thus defining grooves that receive the upper ends 92 of a pair of support struts 94 and 96 thus providing for support and positioning of the rectangular frame relative to a container for soiled mop cloths or refuse. The lower ends of the a pair of support struts 94 and 96 define support saddle sections 98 and 100 that fit the curvature of the side members 14 and 16 and are secured to the side members by fasteners 102 such as rivets, screws, bolt and nut assemblies or the like. A pair of handle elements 104 and 106 extend from upper portions of the support struts 94 and 96 and have handgrips that are positioned to be grasped and manipulated by a user of the trolley to position it for efficient floor cleaning activity. The upper forward part of the moveable container support structure is mounted to the connecting member 58 by means of clamp devices or other mounting devices 108 depending on whether or not the rectangular frame is to be removable.

Figure 3:
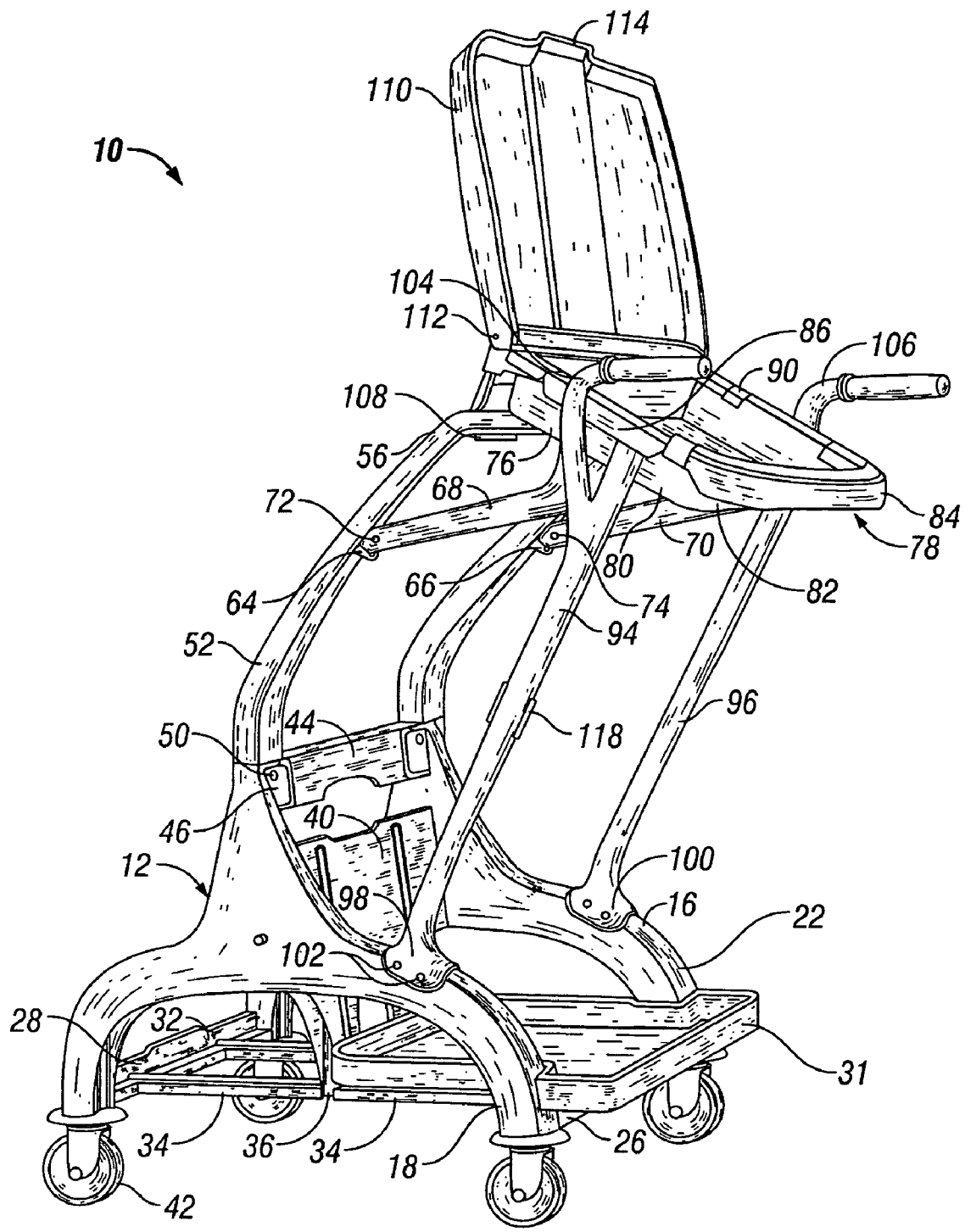

The moveable container support structure 78 is capable of being pivoted downwardly to an out of the way position to permit other objects to be supported by the trolley mechanism. This can be accomplished by raising the rear portion of the container support structure 78 so as to clear the upper ends 90 of the support struts 94 and 96 from within the recesses defined by the side flanges 86. The support struts 94 and 96 are then spread slightly and the container support frame is pivoted downwardly about its mounting clamp devices 108. A closure member 110 is pivotally mounted to the container support structure 78 by one or more pivot members 112 and is shown in FIG. 2 to be in its closed position relative to a container that is supported by the rectangular frame. The closure member is provided with an actuating projection 114 which is manipulated by a user of the trolley mechanism to open the closure member as shown in FIG. 3 or move the closure member to the closed position shown in FIGS. 2, 4 and 5.

Figure 4:
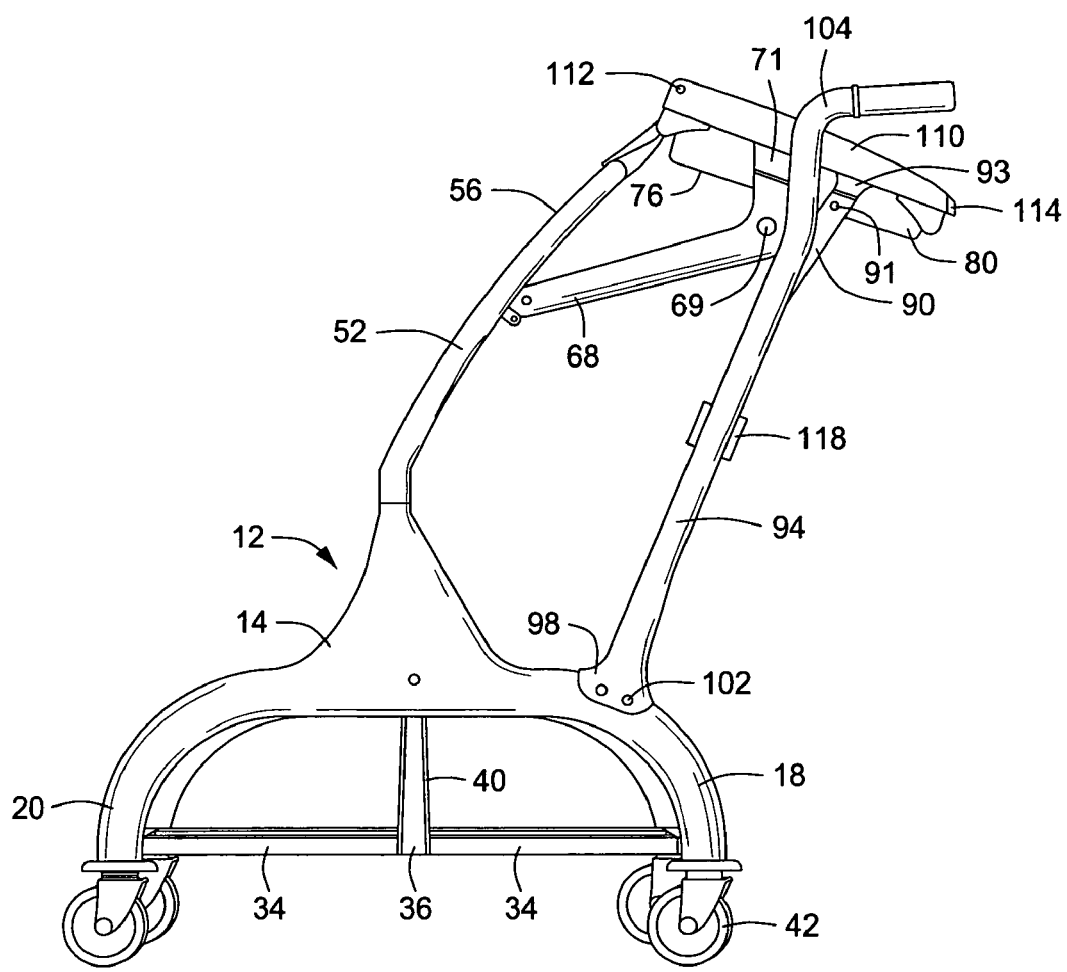
Figure 5:
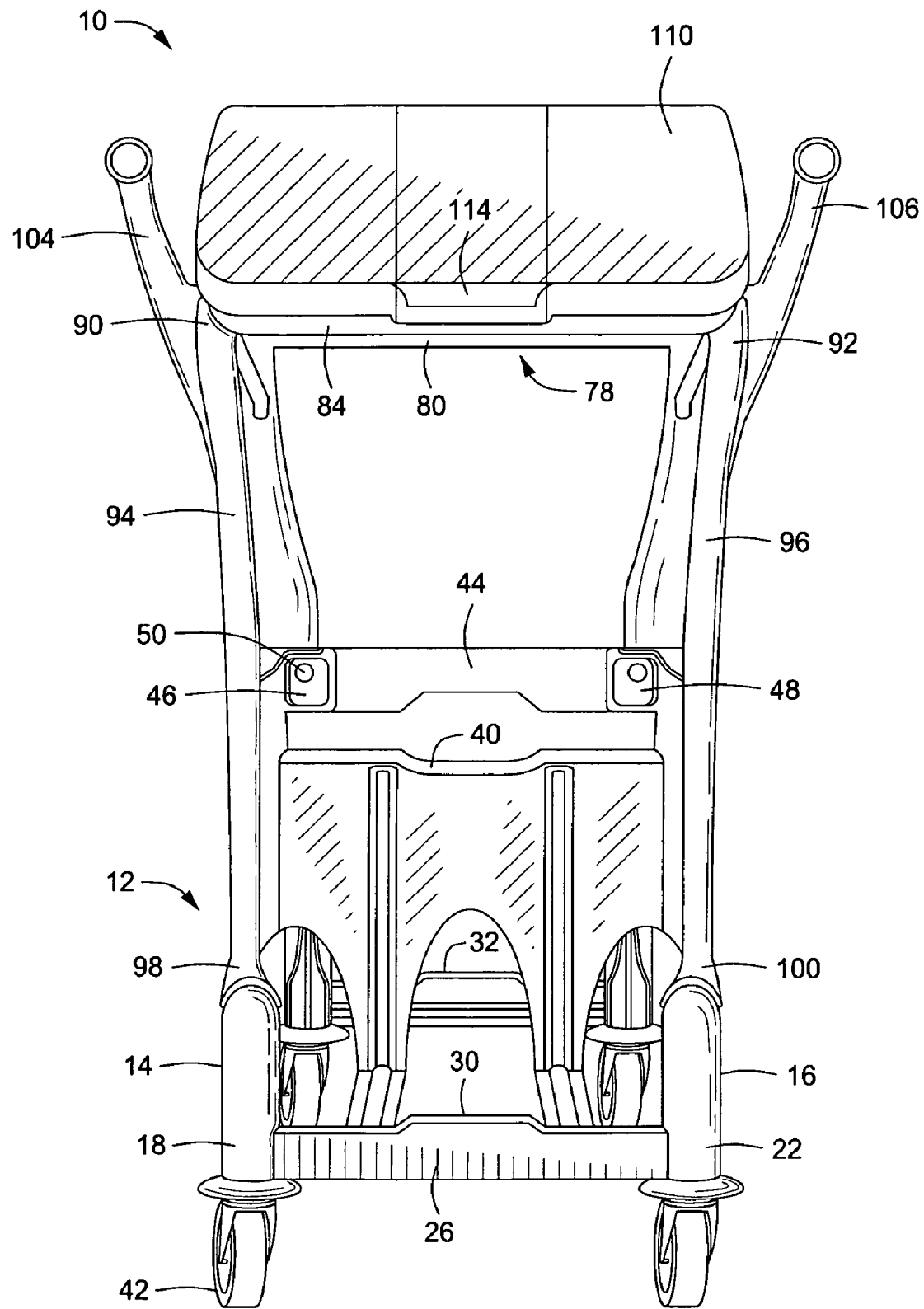

If it is not intended that the moveable container support structure 78 be capable pivoting downwardly, then elements 64 and 66 may simply take the form of a fixed mounts to which the lower end of the inclined support arms are secured by fasteners. In this case the upper end portions of the inclined support arms will be fixed to the rectangular frame, providing the rectangular frame with intermediate support. Also in such case, as shown in FIG. 4, fastener devices, such as bolts, screws, nut and bolt assemblies, may be employed to secure the upper ends of the support struts 94 and 96 with respective connection projections 93 that depend from the container support structure 78. Likewise, the upper ends of the inclined support arm members 68 may be secured by similar fasteners 69 to downwardly depending connector members 71 of the container support structure 78.

It is shown in FIG. 2 that containers or receptacles such as shown at 116 may be releasably supported outboard of the support struts 94 and 96. In such case the support struts 94 and 96 are provided with mounting devices 118, shown in FIG. 2, that establish bayonet or other interfitting connection and support with one or more connector members of the container or receptacle 116.

Figure 1:
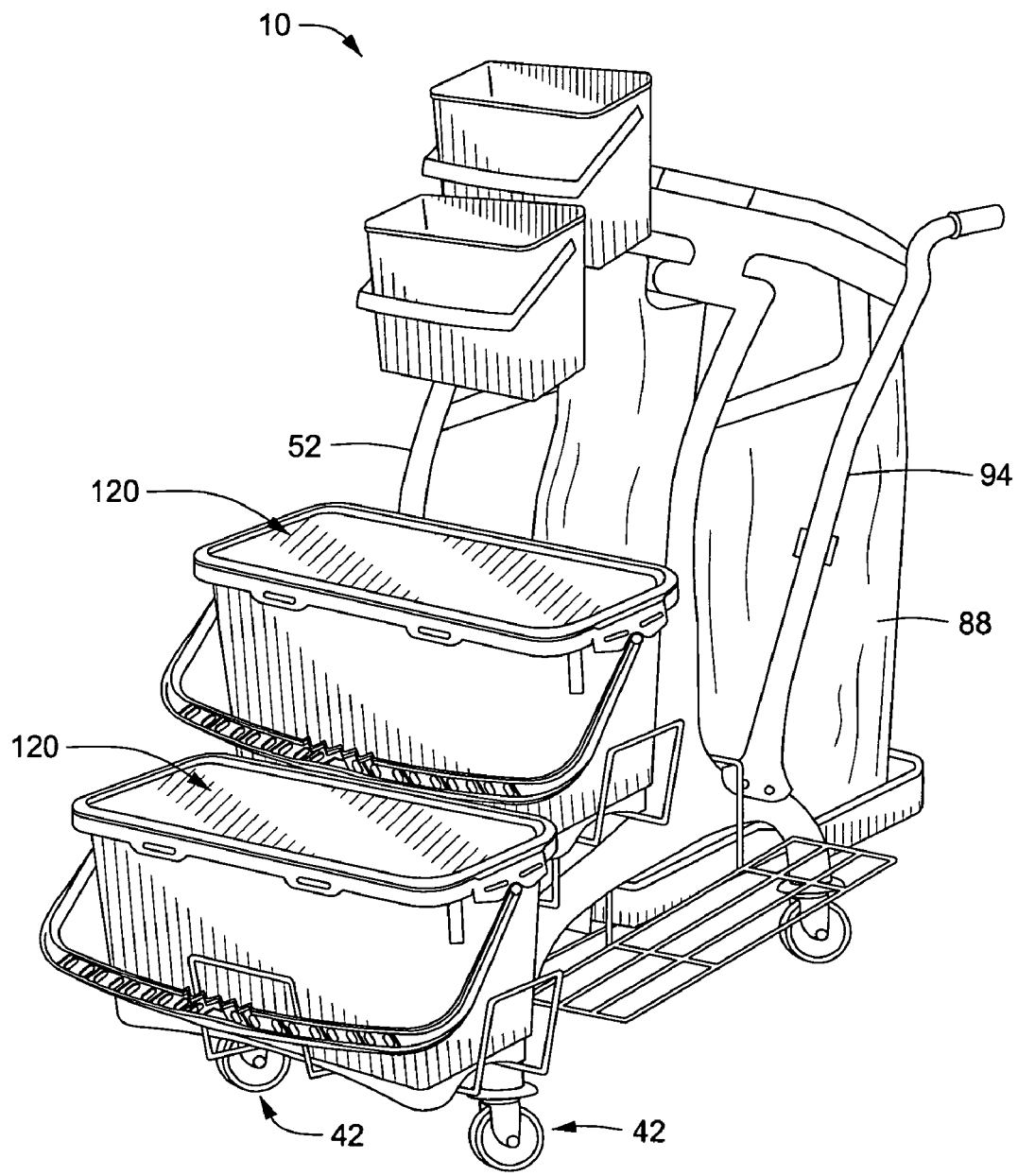

As illustrated in FIG. 1, the trolley mechanism of FIGS. 1-5 is designed to provide for efficient support and positioning of one or more "top-down" containers, generally identified by reference numeral 120. The term "top-down", which will become more apparent in the discussion below, generally identifies the method or procedure and the container structure that permits efficient pre-saturation of mop cloths with a solution of cleaning and disinfectant material and presenting the pre-saturated mop cloths for efficient acquisition and use by floor cleaning personnel. A top-down container, as shown in FIGS. 6-10 comprises an integral container body 122 having opposed side walls 124 and 126 and opposed end walls 128 and 130 and a bottom wall structure 132. The bottom wall structure 132 is integral with the container body and merges smoothly with the side and end walls by means of smoothly curved bottom corners. Preferably the container body 122 is of tapered rectangular configuration with smoothly curved corners to substantially match the configuration of new or clean floor mop cloths; however, it should be borne in mind that the container body may have other forms or configurations, such as round or oval configurations, without departing from the spirit and scope of the present invention. The side, end and bottom walls of the container body 120 are preferably formed of a suitable polymer material by a molding operation and have a thickness in the range of from about $\frac{1}{16}$" to about $\frac{3}{16}$"; however the wall and bottom thickness may be less or greater if desired, to provide for the light weight or durable nature of the container structure.

Figure 6:
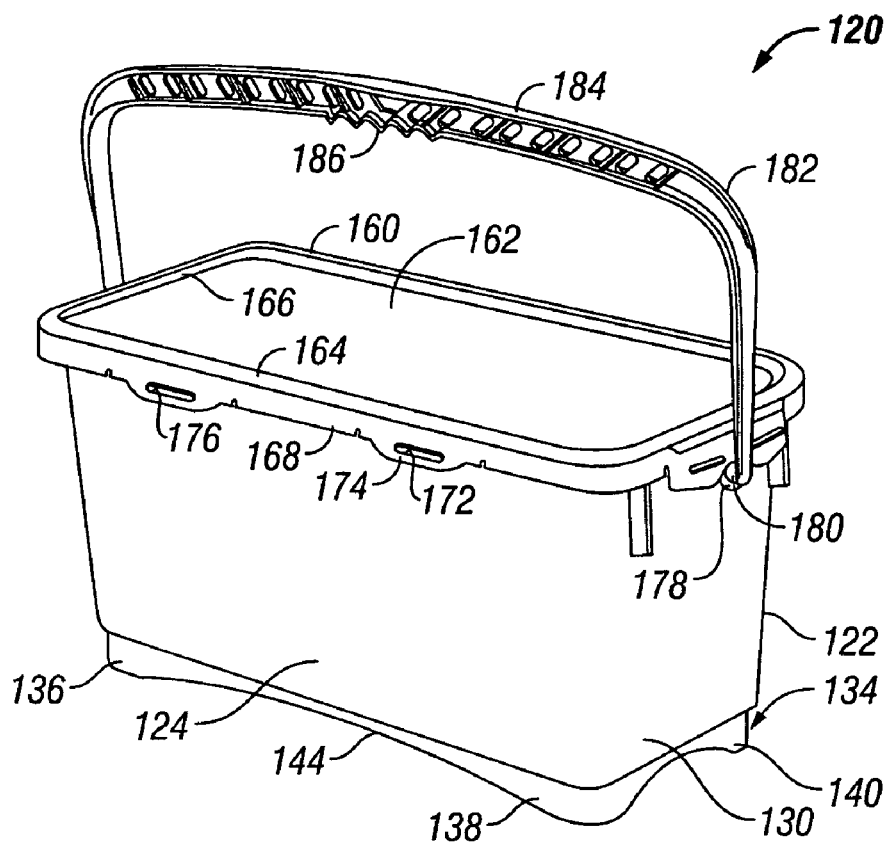
Figure 7:
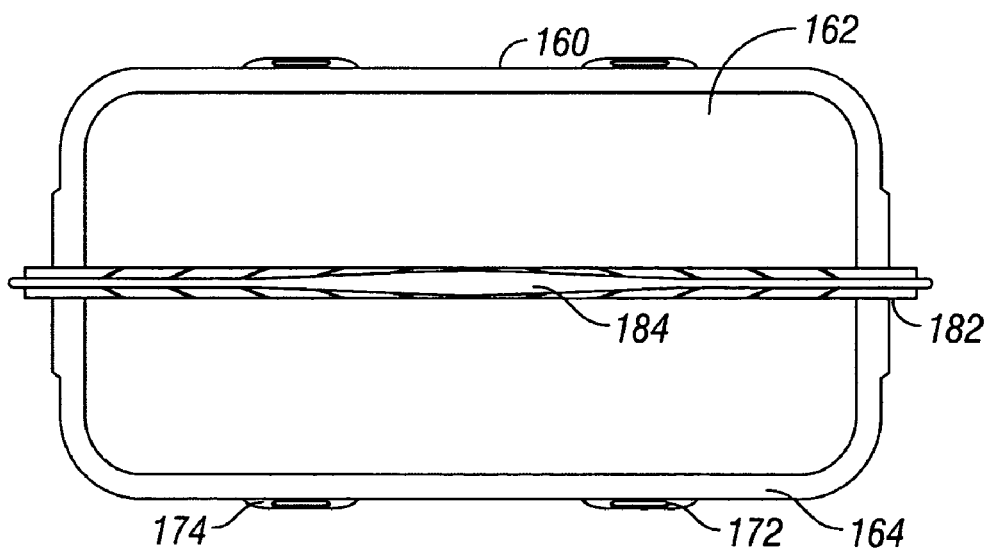
Figure 8:
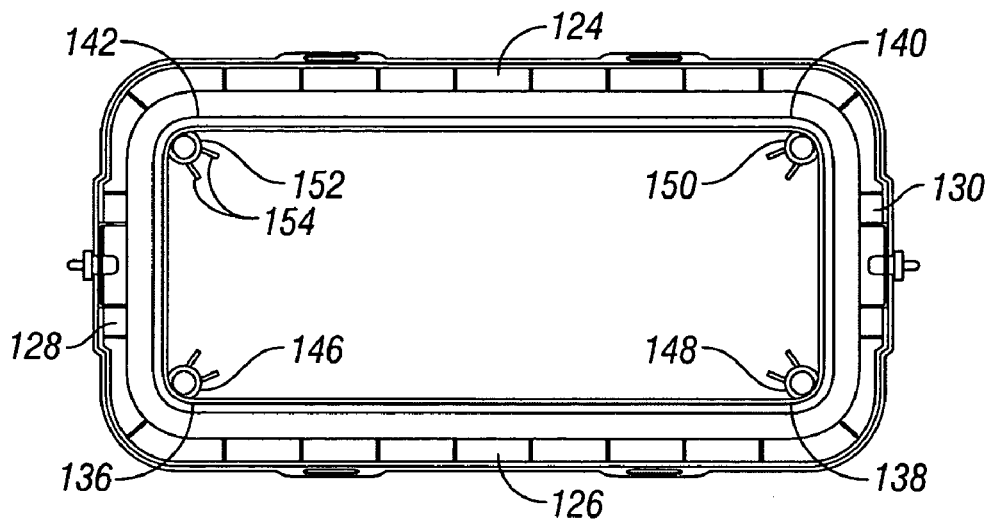
Figure 9:
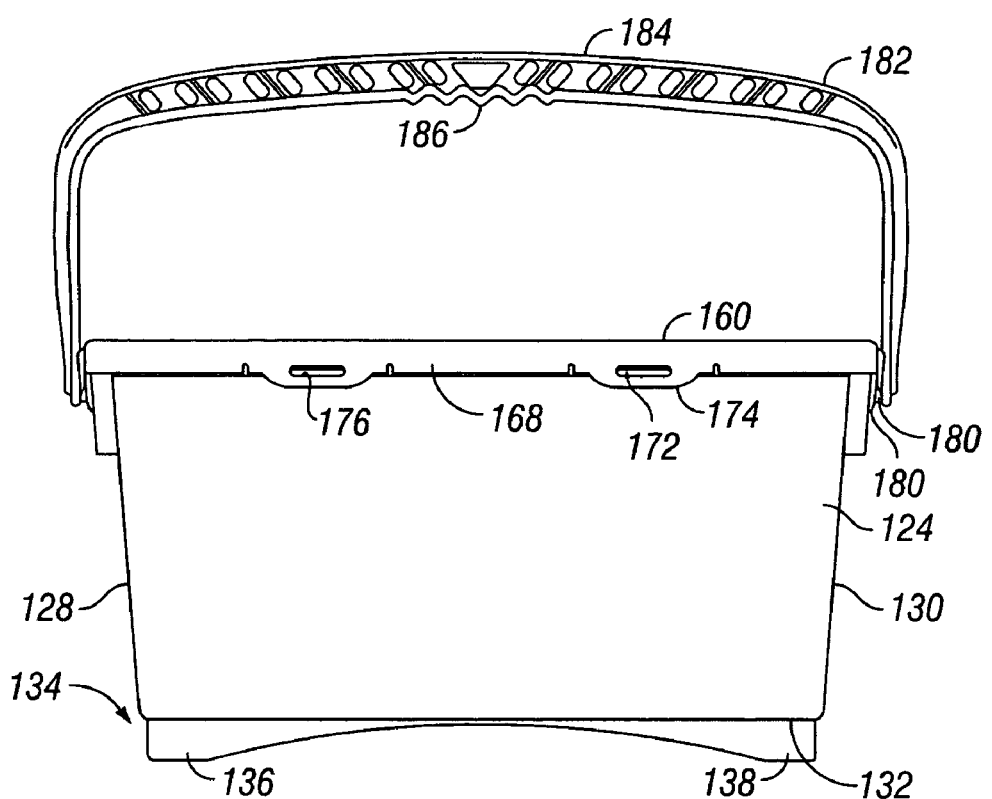
Figure 10:
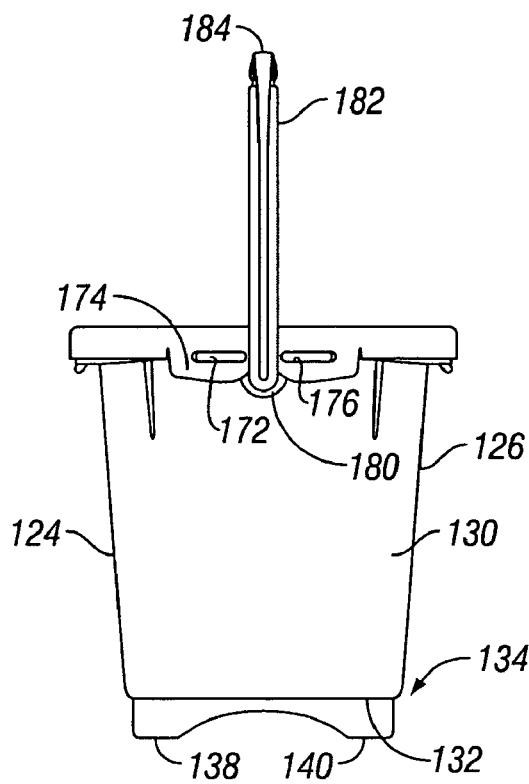

For support of the container 120 in its upright position, as shown in FIGS. 6, 9 and 10, the lower portion of the container is provided with rectangular support structure, shown generally at 134, and which defines support corner sections 136, 138, 140 and 142. The rectangular support structure 134 is recessed or relieved intermediate the support corner sections by smoothly curved relief areas, one being shown at 144 in FIG. 6. With reference to the bottom view of FIG. 8, the support corner sections are respectively strengthened by four circular support elements 146, 148, 150 and 152. The circular support elements are formed integrally with the bottom portion of the container body 120 and are strengthened by triangular webs 154 that are also integral with the container bottom structure and merge with the bottom wall of the container as is evident from the sectional view of FIG. 11.

As mentioned above, new or cleaned mop cloths are pre-impregnated, according to the principles of the present invention by being placed within the internal compartment 121 of the container body 120 and a quantity of cleaning and disinfecting solution is then poured into the container. A cover or closure member for the container is then positioned in hermetically sealed relation with the upper contoured edge of the container body. The closed and sealed container of mop cloths and cleaning and disinfecting solution is then inverted so as to rest on its closure. The cleaning and disinfecting solution, over a period of time, such as overnight, will impregnate the mop cloths by action of osmosis, so that the entire group of mop cloths will become evenly impregnated with the cleaning and disinfecting solution. Thus, it is important that the closure of the container body be capable of sealing with the container body to such extent that leakage of the cleaning and disinfecting solution will not occur with the container inverted.

Figure 11:
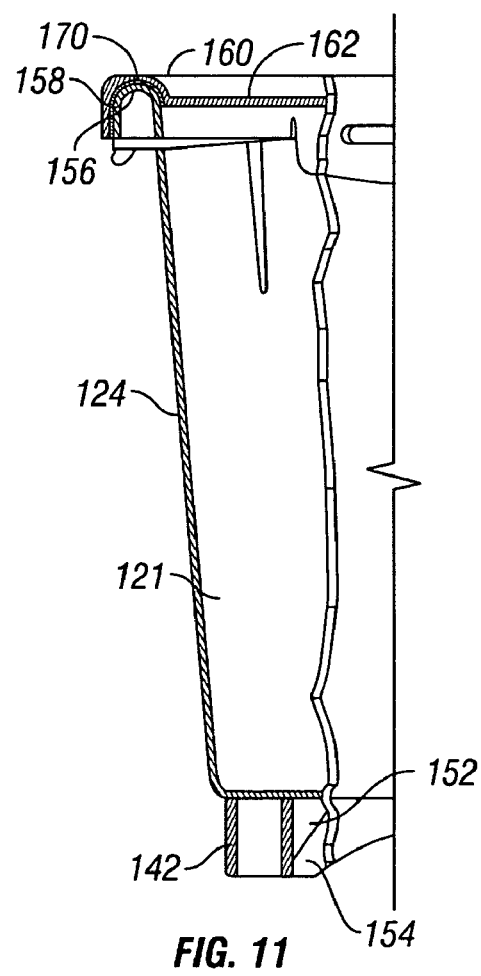

As is evident from FIGS. 6, 9 and 10 and especially the sectional view of FIG. 11, the generally rectangular container body is provided with an upper contoured rim 156 having a down-turned exterior flange 158. A container closure or cover 160 defines a closure panel 162 that is of essentially the same configuration as the configuration of the upper portion of the container. The container closure or cover 160 defines a closure rim 164 having an upwardly extending rim section 166 that is integral with the container closure or cover. The closure rim 164 and the upwardly extending rim section 166 typically project upwardly beyond the plane of the closure panel 162. The closure rim also includes a downwardly extending integral flange or skirt 168 that, with the container closure positioned on the container, extends downwardly at least partially over the downwardly extending flange 158 of the container rim. The upwardly extending rim section 166, the closure rim 164 and the downwardly extending integral flange or skirt 168 cooperate to define a generally rectangular seal recess 169 having a contoured cross-sectional configuration. A closure seal element 170 is positioned within the generally rectangular seal recess 169 and, when the closure 160 is assembled to the rim of the container, the seal element establishes liquid tight sealing of the closure to the container rim and prevents leakage of the liquid cleaning and disinfecting solution when the container is inverted for impregnation of the mop cloths.

To enhance the sealing capability of the closure 160 with respect to the upper rim of the container 12, each of the upper sides and ends of the container structure define outwardly projecting locking elements 172. The downwardly extending integral flange or skirt 168 of the closure 160 defines at least one and preferably a pair of locking tabs 174, each defining a locking opening 176 through which portions of the outwardly projecting locking elements 172 extend to releasably lock the closure 160 to the container structure. The locking openings 176 are in locking registry with the outwardly projecting locking elements 172 when the seal element establishes sealing engagement with the upper rim of the container. In practice, a person using the container and having put mop cloths and cleaning and disinfecting solution in the container compartment, will place the closure on the container rim and apply downward force on the closure to fully engage the container rim within the seal recess and establish sealing of the closure to the container rim. Then the user will simply apply sufficient force to the yieldable locking tabs 174 to move the locking openings over the outwardly projecting locking elements 172. After the closure has been sealed and locked to the upper portion of the container in this manner, the closed and sealed container may then be inverted to a position resting on its cover and may be allowed to remain in this inverted position for a sufficient period of time for the mop cloths to become saturated.

The container of pre-saturated mop cloths is then moved to its upright position and is lifted to position it on a trolley in position for efficient use, or it is carried by cleaning personnel to a site for floor cleaning activity. For lifting and carrying, the end walls of the container are provided with handle bosses 178 that receive pivot elements 180 of a container handle 182. The central portion of a handle bail section 184 of the container handle defines a hand-grip geometry 186 so that the handle will not tend to slip in the hand of a user even when the hands of the user or the handle may be coated with water, cleaning solution or any other such material.

With reference to FIGS. 13 and 14, a mop head is shown generally at 192 and defines a generally rectangular mop cloth support 194 and is provided with a handle support 196 that releasably receives a handle 198. The mop cloth support 194 is provided with a panel of hook and loop fastening material 200 that covers the bottom surface and opposed edges of the mop cloth support. As shown in FIG. 14, a mop cloth is shown generally at 202 and has an opposite panel of hook and loop fastening material 204 so that the mop cloth is capable of being releasably attached to the hook and loop fastening panel 200 of the mop head. Each mop cloth consists of a panel of microfiber floor cleaning material 206 is fixed to the panel of hook and loop fastening material 204 and is of slightly larger dimension as compared with the dimension of the panel of hook and loop fastening material 200, thus permitting the edges of the panel of microfiber floor cleaning material 206 to extend beyond or to be folded about the edges of the mop head 194 as is evident from FIG. 14. A pull tab 208 is fixed to an end portion of the mop cloth 202 and thus provides the user with the capability for easily pulling on the pull tab and releasing the mop cloth from the mop head when the mop cloth has become soiled to the point that its cleaning is required. The soiled mop cloth is then deposited in a soiled mop cloth container of the floor service trolley and a clean and pre-saturated mop cloth is then affixed to the mop head so that floor cleaning activity can continue, without any need to wash the mop cloth on site as is typically the case.

Typically, the mop cloth container will have a volume in the range of from about 10 liters to about 25 liters, the most logical container volume for efficient handling and manual carrying being a container volume of about 20 liters. Containers of this volume will typically contain about 20 microfiber mop cloths. The mop cloths will typically be placed within the container in vertical edgeway position or any other position for efficient impregnation thereof. As shown in FIG. 12, each microfiber of a mop cloth is composed of thin and stiff microfibers and has a cross-sectional configuration that lifts and traps dirt and moisture 190, leaving a mopped floor surface clean and substantially dry. Thus microfiber mop cloths using thin and hard microfibers provide a higher cleaning action as compared to cotton fibers, penetrating into the floor microporosity, absorbing the removed dirt and holding the dirt as shown in FIG. 12 until the mop cloth is later washed. It has been determined that microfiber mop cloths, because of the exceptional durability of the microfibers, readily accommodate about 350 cycles of use and washing before becoming worn to the extent that replacement becomes necessary. The cotton fibers of conventional mop cloths, in contrast, simply dislodge dirt from a floor surface and move it along the floor surface. The result is that dirt and liquid is still present on the floor surface and can only be removed by dry mopping, thus adding to effort and expense of floor cleaning and disinfecting activity.

The top-down system for floor mopping and/or disinfection in facilities such as hospitals, rest homes, clinics, restaurants and the like, where cleanliness must be observed employs pre-impregnated microfiber mopping cloths, together with apparatus and methods for preparing the mopping cloths, using them and cleaning them for further service. The top-down floor cleaning and disinfecting system is of simple nature and guarantees a quick performance and a considerable improvement in the results as compared with traditional floor cleaning systems. Furthermore, the top-down floor cleaning system joins together the advantages of pre-impregnation, which is the preparation beforehand of floor cleaning cloths, to the ones of microfiber. Because of the stiff and very thin fibers, microfiber ensures a higher cleaning action compared to cotton fibers, penetrating into the floor microporosity, absorbing the removed dirt and moisture and holding the dirt and moisture to the microfiber until the mop cloth is subsequently washed.

The top-down floor cleaning and disinfecting system, with pre-impregnated mop cloths offers several advantages compared to traditional methods based on the use of cotton fiber mops and trolleys having one or more mop washing buckets and a mop wringer for minimizing the moisture content of the mop cloths. The most obvious advantage is elimination of the preparation phase wherein a cleaning and disinfecting solution is present at the floor being cleaned and is typically in an open container so that spillage and dripping of the cleaning solution often occurs as the cleaning and disinfecting solution are frequently changed. Also, when mop cloths are cleaned in an area where a floor surface is being cleaned, typically the mop cloths are not efficiently cleaned, especially as the cleaning solution becomes more and more fouled with dirt, dust and other contaminants. This is especially disadvantageous when the area of the floor being cleaned is located within a hospital or clinic ward where clean and sterile conditions are maintained for the benefit of patients and nursing personnel. When the top-down floor cleaning and disinfecting system is employed, no changing of the cleaning and disinfecting solution occurs. The top-down floor cleaning and disinfecting system requires the preparation of properly cleaned and impregnated mop cloths beforehand, directly in a laundry room and not in a ward or other clean and sanitary area. Thus, there is no risk that the end user of the system will use or handle dirty or contaminated mop cloths in an area where sanitary conditions must be maintained.

The top-down floor cleaning and disinfecting system also provides for higher performance as compared with traditional floor cleaning systems, owing to the exceptional cleaning action of microfiber with the subsequent breaking down of the bacterial charge that is present on the floor surface. The microfiber mop cloths are resistant to a high number of washing cycles (about 350 cycles at a temperature of about 90° C.), thereby minimizing the costs and significantly enhancing the commercial advantage of the top-down floor cleaning and disinfecting system. Another significant advantage is the remarkable reduction in labor costs due to the labor savings that exist due to the fact that cleaning activities for mop cloths do not occur during floor cleaning activity, but rather occur at times when floor cleaning is not being done.

Another advantage is that the method of floor cleaning according to the present invention is simple in nature. The pre-impregnated mop cloths, lying an a 20 liter container, are taken still in the container from the laundry and transported with a small trolley to the area, such as a ward, where a service trolley is located. In the ward, the end user will open the hermetically sealed container and will remove a previously cleaned and impregnated mop cloth from the container and attach it to the head of a mop. The user will then apply the mop to the foor surface to clean and disinfect about from about 10 to about 20 square meters of the floor surface, after which the mop cloth is considered to be soiled. The user will remove the soiled mop cloth from the mop head and deposit the soiled mop cloth in a soiled cloth receptacle that is present on the service trolley. After 20 or so soiled mop cloths have been collected, they are transported to the laundry room where they are first cleaned by washing, typically in a washing machine, and are then impregnated with cleaning and disinfecting solution. If new or dry microfiber mop cloths are being treated, they will typically have a dry weight of about 90 grams each, the weight of the mop being a function of the dimension of the mop cloths. For pre-impregnation, a worker will place about 20 mop cloths within a top-down container and then pour about four liters of cleaning/disinfectant solution into the container, the volume of the cleaning/disinfectant solution being a function of the number of mop cloths, the dimension of the mop cloths and the desired level of impregnation for the mop cloths. The closure will then be sealed and locked to the container, providing the hermetic seal that is necessary to prevent leakage of the solution. The container is then inverted and is caused to rest on its closure or top, so that the mop cloths become saturated to a predetermined extent by the action of osmosis. If the mop cloths have been washed but not dried, and contain a quantity of moisture from the washing cycle, then a lesser quantity of cleaning/disinfectant solution is needed to achieve desired saturation of the mop cloths. Also, if the mop cloths have a moisture content, it is generally appropriate that the lesser volume of cleaning/disinfectant solution be more concentrated to accommodate the water content of the mop cloths. The pre-impregnated mop cloths will be evenly saturated with the cleaning/disinfectant solution and therefore will attain desired cleaning of a floor surface without any need to add or remove moisture during floor cleaning activity.

In view of the foregoing it is evident that the present invention is one well adapted to attain all of the objects and features hereinabove set forth, together with other objects and features which are inherent in the apparatus disclosed herein.

As will be readily apparent to those skilled in the art, the present invention may easily be produced in other specific forms without departing from its spirit or essential characteristics. The present embodiment is, therefore, to be considered as merely illustrative and not restrictive, the scope of the invention being indicated by the claims rather than the foregoing description, and all changes which come within the meaning and range of equivalence of the claims are therefore intended to be embraced therein.

I claim:

1. A method for cleaning floors, comprising:

providing a container of generally rectangular configuration defining a mop cloth compartment, said container having a generally rectangular bottom wall of defined dimension and tapered side and end walls and an upper sealing rim of greater dimension than said defined dimension and having a removable cover defining a seal recess containing a sealing member establishing liquid tight sealing with said upper sealing rim providing a mobile floor service trolley defining at least one container receptacle and having a soiled mop cloth receptacle;

placing within the mop cloth compartment a stack of clean generally rectangular mop cloths and a measured quantity of floor cleaning solution and positioning said cover in sealed relation with said upper sealing rim of said container;

inverting the sealed container for a sufficient period of time for even saturation of the stack of generally rectangular mop cloths by the floor cleaning solution;

positioning the sealed container upright and in support by the container receptacle and moving the mobile floor service trolley to a site for floor cleaning;

removing the cover from the sealed container and removing individual pre-saturated mop cloths one at a time from the stack of generally rectangular mop cloths within the mop cloth compartment of the sealed container and conducting floor cleaning with the pre-saturated mop cloths releasably attached to a mop head and depositing soiled mop cloths in the soiled mop cloth receptacle;

transporting the soiled mop cloth receptacle and the soiled mop cloths contained therein to a laundry facility and cleaning the soiled mop cloths to prepare them for reuse upon removal of all of the clean and pre-saturated mop cloths from the mop cloth container replacing the empty mop container with another container of pre-saturated mop cloths and returning the empty mop cloth container to the laundry facility for refilling thereof with clean mop clothes; and pre-saturating the clean mop cloths by adding cleaning solution and a stack of clean mop cloths to the mop cloth container, placing said cover with said seal in sealed relation with the rim of the container and inverting the container of mop cloths for even saturation of the mop cloths over a period of time by action of osmosis.

2. The method of claim 1, wherein the mop cloths comprise a generally rectangular panel of microfiber floor cleaning material fixed to a first panel of hook and loop fastening material and a second panel of hook and loop fastening material being fixed to the mop head, said method comprising:

positioning said first and second hook and loop fastening panels in contact to releasably support a mop cloth by the mop head; and applying a pulling force to said mop cloth to separate said first and second hook and loop fastener panels and remove said mop cloth from said mop head.

3. The method of claim 1, wherein said container defines a closure rim and said step of positioning a cover in sealed relation with the container comprising:

providing a closure having a seal recess corresponding to the dimension and configuration of said closure rim and having a closure seal within said seal recess disposed for sealing engagement with said closure rim; and assembling said closure to said closure rim and positioning said closure seal in sealing engagement with said closure rim, said sealing engagement preventing leakage of liquid between said closure and said closure rim when said container is inverted for a period of time for pre-saturation of said mop cloths by osmosis.

* * * * *